(12) United States Patent
Poupon et al.

(10) Patent No.: US 11,952,135 B2
(45) Date of Patent: Apr. 9, 2024

(54) SHACKLE FOR FASTENING AN AIRCRAFT ENGINE COMPRISING A PAIR OF ENCAPSULATED ANTI-FRICTION COATINGS, AND AIRCRAFT COMPRISING SUCH A SHACKLE

(71) Applicant: Airbus Operations SAS, Toulouse (FR)

(72) Inventors: Cédric Poupon, Toulouse (FR); Olivier Pautis, Toulouse (FR); Jonathan Blanc, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 108 days.

(21) Appl. No.: 17/851,407

(22) Filed: Jun. 28, 2022

(65) Prior Publication Data
US 2023/0002067 A1   Jan. 5, 2023

(30) Foreign Application Priority Data
Jun. 30, 2021  (FR) ...................................... 2107055

(51) Int. Cl.
*B64D 27/26* (2006.01)
*F16C 11/06* (2006.01)

(52) U.S. Cl.
CPC .......... *B64D 27/26* (2013.01); *F16C 11/0628* (2013.01); *B64D 2027/262* (2013.01)

(58) Field of Classification Search
CPC ........ B64D 2027/262; B64D 2027/266; B64D 2027/268; F16C 11/0628
See application file for complete search history.

(56) References Cited

U.S. PATENT DOCUMENTS

| 5,456,008 A | 10/1995 | Hugon |
| 5,860,623 A * | 1/1999 | Dunstan ................. B64D 27/26 60/797 |

(Continued)

FOREIGN PATENT DOCUMENTS

| EP | 0614722 A1 | 9/1994 |
| EP | 2048389 A2 | 4/2009 |

(Continued)

OTHER PUBLICATIONS

French Search Report; priority document.

*Primary Examiner* — Richard G Davis
(74) *Attorney, Agent, or Firm* — Greer, Burns & Crain, Ltd.

(57) ABSTRACT

A shackle for fastening an aircraft engine including a ball joint with a pin including a ring including a first bore and a sleeve assembled in the first bore and having a second bore configured to receive the pin and the diameter of which progressively increases to have a flared inner surface at each of its ends, the fastening shackle being arranged such that a spherical outer surface of the ring bears an anti-friction coating produced on a region extending beyond the contact region with the body of the shackle, this first region being bordered by rims forming a projection around the coating, and/or the second bore bears an anti-friction coating on a region extending beyond its contact region with the pin, this region being bordered by rims forming a projection around this anti-friction coating, at the ends of the flared inner surface.

11 Claims, 5 Drawing Sheets

(56) References Cited

U.S. PATENT DOCUMENTS

| | | | |
|---|---|---|---|
| 2008/0156930 A1 | 7/2008 | Audart-Noel et al. | |
| 2009/0154990 A1 | 6/2009 | Julliere | |
| 2010/0040407 A1* | 2/2010 | Rechtien | F16C 43/02 403/122 |
| 2011/0142532 A1* | 6/2011 | Diemirbey | B22F 3/24 403/56 |
| 2014/0042268 A1* | 2/2014 | Sandy | B64D 27/26 244/54 |
| 2015/0139575 A1* | 5/2015 | Romano | F16C 11/0628 156/293 |
| 2016/0003293 A1* | 1/2016 | Blachon | F16C 11/0609 384/212 |
| 2016/0122029 A1* | 5/2016 | Serra | B64D 27/26 244/54 |

FOREIGN PATENT DOCUMENTS

| | | |
|---|---|---|
| EP | 2963304 A1 | 1/2016 |
| EP | 3159084 A1 | 4/2017 |
| FR | 2887853 A1 | 1/2007 |

* cited by examiner

SHACKLE FOR FASTENING AN AIRCRAFT ENGINE COMPRISING A PAIR OF ENCAPSULATED ANTI-FRICTION COATINGS, AND AIRCRAFT COMPRISING SUCH A SHACKLE

CROSS-REFERENCES TO RELATED APPLICATIONS

This application claims the benefit of the French patent application No. 2107055 filed on Jun. 30, 2021, the entire disclosures of which are incorporated herein by way of reference.

FIELD OF THE INVENTION

The present invention relates to a fastening shackle for realizing a connection between an aircraft engine and an engine pylon. The invention relates more particularly to an arrangement of anti-friction coatings on a ball joint of such a shackle, and to an aircraft comprising such a shackle.

BACKGROUND OF THE INVENTION

Two-point or three-point fastening shackles, also sometimes called links or connecting rods, are commonly used for fastening aircraft engines to the engine pylons secured to the structure of the aircraft. These engine mounts participate in a so-called "isostatic" mechanical interface system for transferring forces, immobilizing in six degrees of freedom and making it possible to ensure non-stressed mounting while complying with certification and safety requirements. The mechanical interface systems between an engine and an engine pylon have the particular feature of being subjected to high temperatures, given the proximity of the engine, in particular with regard to the so-called rear engine mounts. Premature ageing phenomena occur, in particular owing to the numerous thermomechanical cycles experienced by these elements of the aircraft. Recent fastening techniques make it possible to carry out quick mounting and demounting operations of aircraft engines by using engine fastening shackles into which are inserted pins which also pass through devises of fittings arranged on an engine pylon or on an engine. These engine fastening shackles use anti-friction coatings to limit the wear of contact surfaces between connection elements and to improve the characteristics of the connection interface. It unfortunately arises that these coatings degrade or flake progressively, mainly on their edges or starting from their edges, thus resulting in a stripping or peeling (or delaminating) phenomenon prejudicial to the quality of the mechanical connections realized. These phenomena make it necessary to change the connection parts bearing the coatings.

The situation can therefore be improved.

SUMMARY OF THE INVENTION

The present invention is aimed, in particular, at creating an encapsulation of the anti-friction surface coatings of the connection elements of a shackle for fastening an aircraft engine and to make it possible to thus preserve these coatings from premature wear.

Accordingly, the subject of the invention is a shackle for fastening an engine of an aircraft to a pylon secured to the structure of the aircraft, via at least one pin, the shackle comprising a body and a point for fastening to said pin via a ball joint, the ball joint comprising a ring having a spherical outer region and a first bore, the ring being assembled in a cavity of the body of the shackle having a shape complementary to said spherical outer region, the shackle further having the following features:
- the ball joint comprises a sleeve assembled in the first bore and having a second bore configured to receive said pin and the diameter of which progressively increases to have a flared inner surface at each of its ends,
- the spherical outer surface of the ring bears a first anti-friction coating produced on a first region extending beyond its contact region with the body of the shackle and said first region is bordered by first rims forming a projection with respect to the spherical outer surface of the ring, around the first coating, so as to form a protective stop around the first coating and to encapsulate it, and/or
- the second bore, of the sleeve, bears a second anti-friction coating on a second region extending beyond its contact region with said pin and said second region is bordered by second rims forming a projection with respect to the surface of the second bore, around the second anti-friction coating, at the ends of the flared inner surface of the sleeve.

Advantageously, it is thus possible to protect, by means of a border forming a projection and flange, the edges of the anti-friction coatings applied to the surfaces of mechanical connection elements and to consequently increase the life of the coatings by consequently avoiding or reducing peeling or disaggregation phenomena. This therefore makes it possible to reduce the maintenance operations and the associated costs. It appears moreover to be easier to coat the surfaces in question again in the event of wear of the coatings.

The fastening shackle according to the invention may also comprise the following features, considered alone or in combination:
- The first and second rims have a height greater than or equal to 0.1 mm
- The surface of the cavity of the body of the shackle having a shape complementary to said spherical outer region of the ring bears a third anti-friction coating. This advantageously increases the qualities of the connection interface between the surface of the spherical region of the ring and the surface of the cavity of the body of the shackle in which the ring is housed.
- The first anti-friction coating is made of a copper-nickel-indium alloy of type Cu36Ni5In or of a cobalt alloy and has a thickness of between 50 µm and 300 µm, preferably 100 µm.
- The second anti-friction coating is made of a copper-nickel-indium alloy of type Cu36Ni5In, of a copper-aluminum-Fe alloy of type CuAlFe, or of a cobalt alloy and has a thickness of between 50 µm and 300 µm, preferably 100 µm.
- The third anti-friction coating is produced by bulk treatment or made of nanocomposite material of type WC:C—H and has a thickness of between 0.2 µm and 50 µm, preferably 5 µm.
- The body of the shackle, the ring and the sleeve are made of the same material chosen from: titanium alloys or steel alloys.

Another subject of the invention is a fastening assembly comprising a shackle as described above and a pin bearing on its outer surface, a fourth anti-friction coating made of nanocomposite material of WC:C—H or WCCo type and having a thickness of between 0.2 μm and 50 μm, preferably 5 μm.

According to one embodiment, the pin of the fastening assembly is made of a material chosen from: titanium alloys or steel alloys.

A further subject of the invention is an aircraft comprising a shackle as described above or a fastening assembly as already stated.

BRIEF DESCRIPTION OF THE DRAWINGS

The above-mentioned features of the invention, together with others, will become more clearly apparent from reading the following description of at least one exemplary embodiment, said description being given with reference to the attached drawings, in which.

DETAILED DESCRIPTION OF THE PREFERRED EMBODIMENTS

Figure 1:
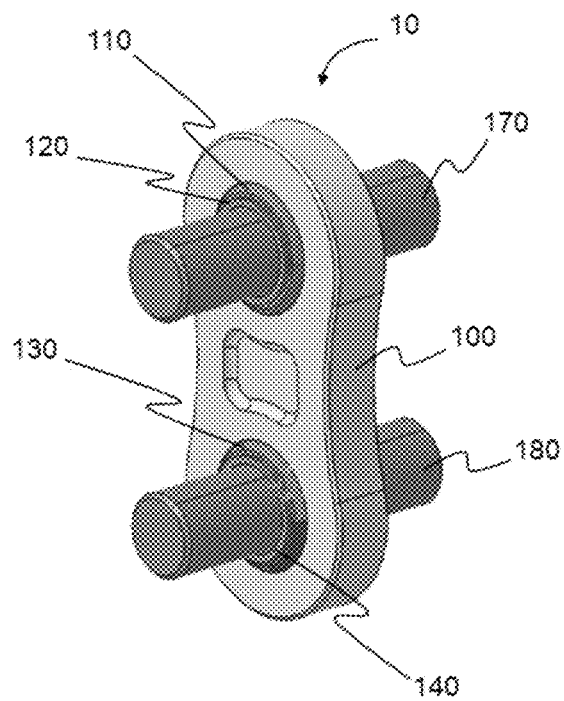
FIG. 1 illustrates, schematically and in perspective, an assembly for fastening an aircraft engine to an engine pylon secured to the structure of an aircraft, according to one embodiment.

FIG. 1 schematically shows a fastening assembly 10 comprising a fastening shackle 100 having a substantially flat body, a first ball joint with a pin 170 and a second ball joint with a pin 180. Such a fastening shackle is commonly referred to as a two-point shackle. It should be noted that the invention described here can be applied to any connection element comprising at least one ball joint and is not limited to the case of a shackle. The fastening assembly 10 is provided and configured to realize a fastening point between an aircraft engine and an aircraft engine pylon secured to the structure of the aircraft. Thus, for example, the pin 170 is intended to be inserted through through-holes of a fitting of the engine pylon or more precisely through through-holes arranged in flanks of an engine pylon fastening clevis, and the pin 180 is intended to be inserted through through-holes of an aircraft engine fastening fitting, or more precisely through through-holes arranged in flanks of a fastening clevis secured to this engine. Fastening assemblies such as that shown here are used to realize fastening points in a so-called "front" part of an aircraft engine, or else in a so-called "rear" part of such an engine. What is to be understood here by front part of an aircraft engine is a part of the engine situated on the side towards which the aircraft moves in flight, and what is to be understood by rear part of an aircraft engine is a part of the engine situated on the side opposite that towards which the aircraft moves in flight, that is to say on the side the aircraft is coming from.

The front part of an engine is generally made up of the fan and compressor stages of a turbomachine and the rear part of an engine is generally made up of the turbine stages of the turbomachine.

The ball joint between the body of the shackle 100 and the fastening pin 170 is produced by virtue of a ring 110, termed inner ring, of generally spherical shape that is arranged in a through-cavity having a surface with a shape complementary to the surface of the spherical region of the ring 110. The ring 110 comprises a bore into which there is inserted a sleeve 120 intended to receive the pin 170. Similarly, the ball joint between the body of the shackle 100 and the fastening pin 180 is produced by virtue of a ring 130, itself also termed inner ring, of generally spherical shape that is arranged in a through-cavity having a surface with a shape complementary to the surface of the spherical region of the ring 130. The ring 130 comprises a bore into which there is inserted a sleeve 140 intended to receive the pin 180.

The rings 110 and 130 therefore have spherical regions intended to be in contact with the surfaces of the through-cavities, of complementary shapes, into which they are respectively inserted. The rings 110 and 130, thus arranged, are free to rotate in their housings and are configured to realize ball joints.

Advantageously, anti-friction coatings are used for the ball joints described, as well as between the pin 170 and the sleeve 120 and between the pin 180 and the sleeve 140.

Specifically, such anti-friction coatings make it possible to produce a lubrication and hardness adaptation interface interposed for example between two parts made of titanium or of titanium alloy performing relative movements between them.

Such an interface most often comprises two coatings forming adaptation layers, among which:

a first adaptation layer is deposited on the first part and has a hardness less than that of the first part, this first layer comprising a microporous morphology, giving it a lubrication adaptation function by retaining the grease of a liquid lubricant in micropores, a second adaptation layer cooperating with the first layer and deposited on the second part, this second layer comprising a hardness greater than that of the first layer and further comprising a lubrication adaptation function by releasing solid lubricants under the effect of friction with the first part.

Conventionally, the fastening points of the rear parts of the engines are subjected to greater temperature stresses owing to the high temperatures produced by the operation of the engines and certain characteristics of such a fastening assembly can vary depending on whether this fastening assembly is intended to realize a connection at a front point (of a front part) or at a rear point (of a rear part) of an aircraft engine.

Thus, for example, the body of the shackle 100, the rings 110 and 130 and also the sleeves 120 and 140 are preferably made of titanium (Ta6V or, in another variant, titanium alloy) in the case of the use for realizing a fastening point at the front of the engine; in that case a so-called "cold shackle" use mode, and the same elements are preferably made of Inconel 718 (or, in another variant, steel alloy) in the case of the use for realizing a fastening point at the rear of the engine; and in that case a so-called "hot shackle" use mode.

In the same way as with regard to the materials used for the manufacture of the body of the shackle 100, the rings 110 and 130 and the sleeves 120 and 140, characteristics of the anti-friction coatings used may vary in the presence of a so-called "cold shackle" use mode, at the front of an engine, or "hot shackle" use mode, at the rear of an engine.

According to one embodiment, the following anti-friction coatings are used for a "cold shackle" arranged at the front of an engine:
- a coating of the body of the shackle 100, applied to the surface having a shape complementary to the spherical region of the ring, is made of nanocomposite material WC:C—H,
- a coating applied to the spherical region of each of the rings 110 and 130 is made of a copper-nickel-indium alloy of type Cu36Ni5In,
- a coating applied to the surface of the bore of the sleeves 120 and 140, including to the flared part of the bore, is made of a copper-nickel-indium alloy of type Cu36Ni5In or of a copper-aluminum-Fe alloy of type CuAlFe,
- a coating applied to each of the pins 170 and 180 is made of a nanocomposite material of type WC:C—H, and the following anti-friction coatings are used for a "hot shackle" arranged at the rear of the engine:
- a coating of the body of the shackle 100, applied to the surface having a shape complementary to the spherical region of the ring, is produced by bulk treatment of the body of the shackle 100, the bulk treatment being low-pressure carburizing,
- a coating applied to the spherical region of each of the rings 110 and 130 is made of a cobalt alloy,
- a coating applied to the surface of the bore of the sleeves 120 and 140, including to the flared part of the bore, is made of a cobalt alloy,
- a coating applied to each of the pins 170 and 180 is made of a nanocomposite material of type WCCo.

According to one embodiment, the coatings respectively applied to the surfaces of the spherical regions of the rings 110 and 130 and to the bore of the sleeves have a thickness of between 50 µm and 300 µm, preferably 100 µm, and the coatings respectively applied to the surfaces of the bores of the body of the shackle 100, of complementary shape to the shapes of the surfaces of the spherical regions of the rings 110 and 130, and to the external surfaces of the pins 170 and 180, have a thickness of between 0.2 µm and 50 µm, preferably 5 µm.

Figure 2:
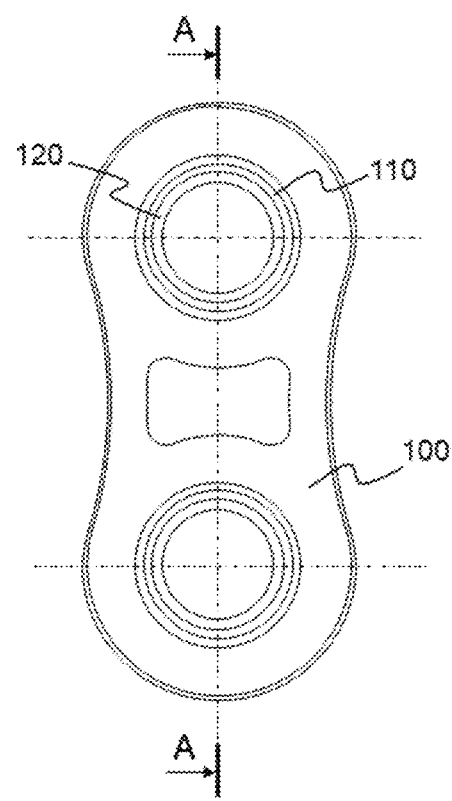
FIG. 2 illustrates, in a front plan view, the fastening assembly already shown in perspective in FIG. 1, defining a section plane A-A useful for a subsequent description of embodiments.

FIG. 2 is a front view illustrating the fastening shackle 100 and defining a section plane A-A with respect to the body of the shackle and also to the ring 110 and to the sleeve 120, which are configured to jointly realize a ball joint with the pin 170 (not shown in FIG. 2). The section plane A-A is used for illustrative purposes in relation to FIG. 3, FIG. 4 and FIG. 5 described below.

Figure 3:
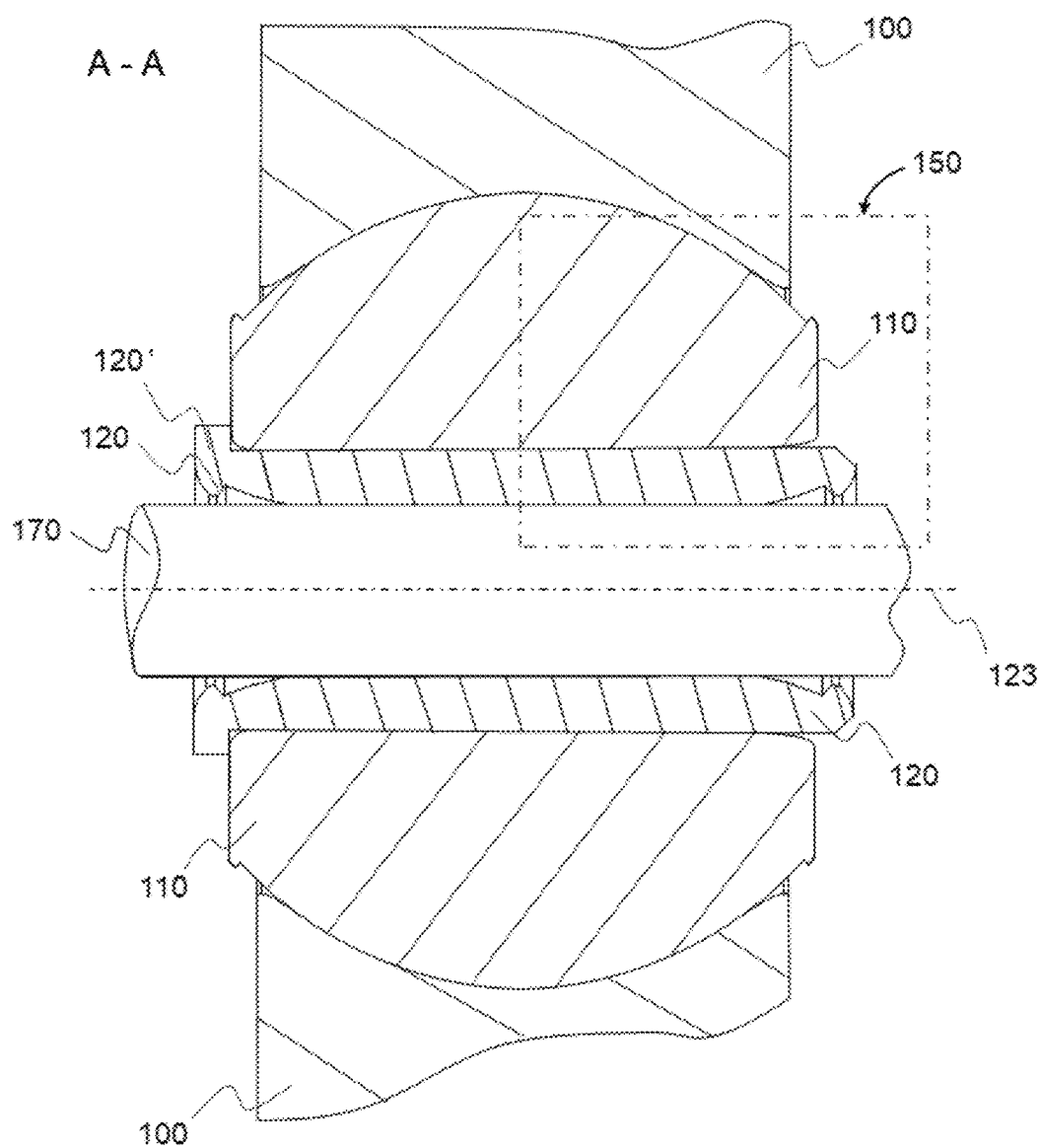
FIG. 3 is a partial section of a ball joint of the fastening assembly already shown in FIG. 1 and FIG. 2, along the section A-A of FIG. 2.

FIG. 3 is a partial section of the fastening shackle 100 along the section plane A-A illustrating the ball joint between the body of the shackle 100 and the pin 170 that is realized by the arrangement of the ring 110 and of the sleeve 120. The sleeve 120 is inserted into a bore of the ring 110, which has the outer general shape of a ball housed in a spherical cavity of the body of the shackle 100, which cavity has a shape generally complementary to the shape of the ring 110. The sleeve 120 comprises a bore arranged about a longitudinal axis 123, which bore is configured to receive the pin 170. There therefore exist contact surfaces between the spherical region of the ring 110 and the body of the shackle 100, on the one hand, and between the inner surface of the sleeve 120 and the pin 170, on the other hand. The arrangement of the ball joint realized by the ring 130 and the sleeve 140 is not shown here, since it is similar to that of the ring 110 and of the sleeve 120. A rectangular window 150 of FIG. 3 appears enlarged in FIG. 4 for the purposes of better describing certain implementation details.

Figure 4:
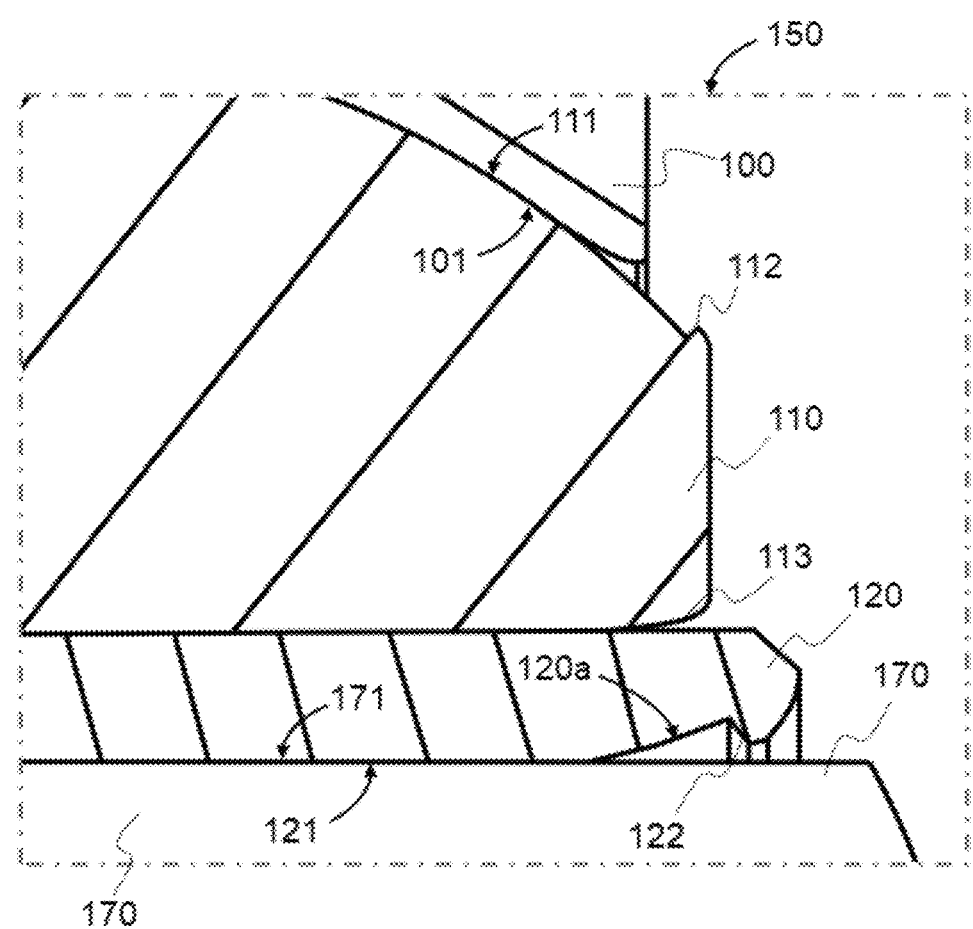
FIG. 4 illustrates, schematically and in an enlarged manner, details of the implementation of elements shown in FIG. 3.

FIG. 4 shows the window of FIG. 3 in an enlarged manner so as to illustrate implementation details more legibly.

With regard to the connection between the ring 110 and the body of the shackle 100, the surface of the spherical region of the ring 110 bears a so-called "thick" coating 111, of a thickness of the order of 100 µm (comprised between 50 µm and 300 µm), and made of a copper-nickel-indium alloy of type Cu36Ni5In for the use of the shackle 100 at a front fastening point of an engine or made of a cobalt alloy for the use of the shackle at a rear fastening point of an engine. The surface of the body of the shackle 100, of complementary shape to the surface of the spherical region of the ring 110, bears a so-called "thin" coating 101, of a thickness of the order of 5 µm (comprised between 0.2 µm and 50 µm), and made of nanocomposite material WC:C—H, for a shackle of a front fastening point for a so-called "cold shackle" application or produced by bulk treatment (low-pressure carburizing) of the body of the shackle for a shackle of a rear fastening point for a so-called "hot shackle" application. Ingeniously, a rim 112 forms a projection and flange with respect to the surface of the spherical region of the ring 110 in order to encapsulate the thick coating 111 applied to the surface of the spherical region of the ring 110, thus preventing the edge of the coating 111 from being able to flake or peel while then progressively disaggregating over an even greater area. Advantageously, the rim 112 forming a projection and flange on the surface of the spherical region of the ring 110 is circumferential, that is to say, it has an edge over the entire perimeter of the free end edge of the ring 110. Advantageously, the projection of the rim 112 makes it possible to simultaneously form a bowl whose bottom is covered with the coating 111 and a lateral protective stop for the coating 111.

With regard to the connection between the sleeve 120 and the pin 170, the inner surface of the sleeve 120, in other words the surface of the bore of the sleeve 120, bears a so-called "thick" coating 121, of a thickness of the order of 100 µm (comprised between 50 µm and 300 µm) and made of a copper-nickel-indium alloy of type Cu36Ni5In or of a copper-aluminum-Fe alloy of type CuAlFe for the use of the shackle at a front fastening point of an engine or made of a cobalt alloy for the use of the shackle at a rear fastening point of an engine. Ingeniously, a rim 122 forms a projection and flange for encapsulating the thick coating 121 applied to the surface of the bore of the sleeve 120, including in a region 120*a* where the diameter of the bore progressively increases towards the end of the sleeve 120 and having a flared shape up to the rim 122. Here again, this makes it possible to prevent the edge of the coating 121 from being able to flake or peel or subsequently disaggregate progressively over an even greater area. Advantageously, the rim 122 forming a projection and flange on the surface of the bore of the sleeve 120 is circumferential, that is to say that it has an edge over the entire perimeter of the free end edge of the bore. Advantageously, the projection of the rim 122 makes it possible to simultaneously form a bowl whose bottom is covered with the coating 121 and a lateral protective stop for the coating 121.

The pin 170 engaged in the sleeve 120 bears a so-called "thin" coating 171. FIG. 4 illustrates the arrangement of the elements between themselves and the location of the coatings on one side only of the ring 110, or in other words at one end only of the sleeve 120. However, the arrangement described is the same on the other side of the ring 110, that is to say, at the other end of the sleeve 120, such that there therefore exist two edges 112 and two edges 122 respectively machined on the ring 110 and on the bore of the sleeve 120. It should be noted, however, that the sleeve 120 is not completely similar at its two ends, since it comprises a shoulder 120' on the bore side of the ring 110, through which bore it is inserted into said ring. The flared shape of the bore of the sleeve 120 is present on both sides of the sleeve 120 in order to simplify the insertion of the pin 170 by facilitating its guidance and by preventing any risk of damage to the coatings during the insertion, parallel to the longitudinal axis of the bore of the sleeve 120. Of course, the dimensions of the elements shown in the figures do not correspond to a reference scale and features are shown in an oversized manner to facilitate the legibility of the description of the embodiments. For example, the height of the edges 112 and 122 is deliberately exaggerated in the figures, as is the flared shape of the ends of the inner surface of the sleeve 120, in other words, of the bore of the sleeve 120.

Figure 5:
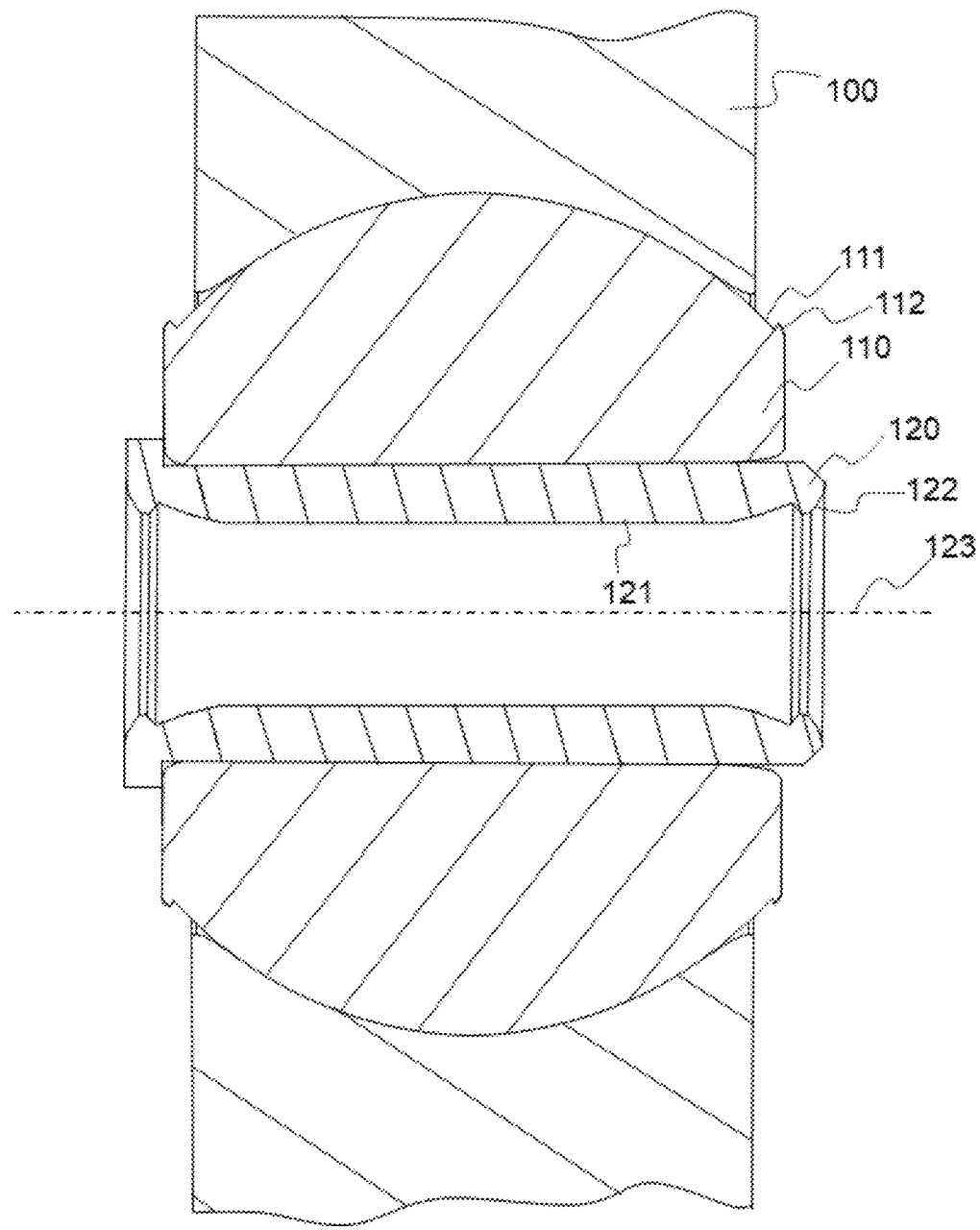
FIG. 5 schematically illustrates a ball joint of a shackle for fastening an aircraft engine.

FIG. 5 illustrates all the elements making up the ball joint between the body of the shackle 100 and the pin 170, namely the ring 110 into which is inserted the sleeve 120 having a bore whose ends have a flared shape, realized about an axis 123. The surfaces bearing the thick coatings 111 and 121 are respectively bordered by the rims 112 and 122.

Figure 6:
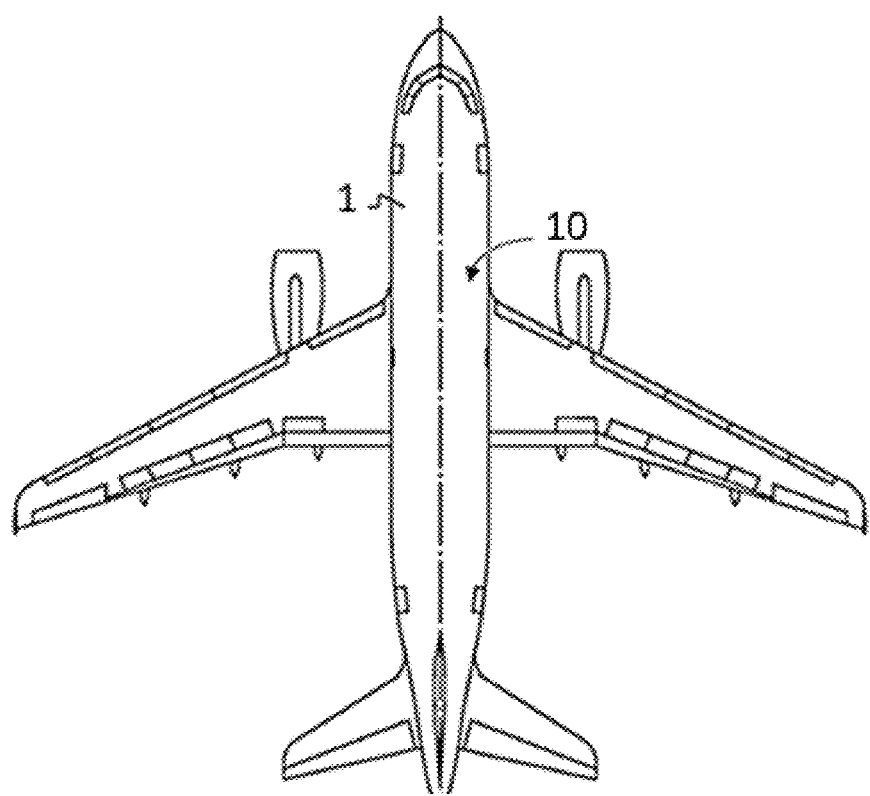
FIG. 6 is a top view showing an aircraft comprising a shackle for fastening an aircraft engine according to one embodiment.

FIG. 6 illustrates an aircraft 1 comprising at least the shackle 100 or a shackle for fastening an engine that is similar to the shackle 100, thereby making it possible to advantageously increase the life of the engine mounts.

The invention is not limited to just the embodiments and examples described above, but relates more generally to any mechanical part, such as a shackle for fastening an aircraft engine for example, comprising an anti-friction coating applied to a region bordered by a rim for the purposes of encapsulating this coating and of limiting the risks of premature abrasion, flaking, detachment or disaggregation of this coating. In particular, variants may comprise anti-friction coatings other than those stated in the examples described. According to variants, a shackle for fastening an engine according to the invention may also be configured to comprise more than two points for fastening to a pin, for example three points for fastening to a pin.

According to further variants, the surface of the spherical region of the ring of a ball joint as described bears an anti-friction coating bordered by a protective rim, and the surface of the bore of the sleeve of the same ball joint does not bear an anti-friction coating or bears an anti-friction coating which is not bordered by a protective rim.

According to further variants, the surface of the bore of a sleeve of a ball joint as described bears an anti-friction coating bordered by a protective rim, and the surface of the spherical region of the ring of the same ball joint does not bear an anti-friction coating or bears an anti-friction coating which is not bordered by a protective rim.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A shackle for fastening an engine of an aircraft to a pylon secured to a structure of the aircraft, via at least one pin, the shackle comprising:
  a body, and
  a point for fastening to said pin via a ball joint, the ball joint comprising a ring having a spherical outer region and a first bore, the ring being assembled in a cavity of the body of the shackle having a shape complementary to said spherical outer region,
    the ball joint comprises a sleeve assembled in the first bore and having a second bore configured to receive said pin and a diameter of the sleeve progressively increases to have a flared inner surface at each of its ends, and
    at least one of
      a spherical outer surface of the ring bears a first anti-friction coating produced on a first region extending beyond its contact region with the body of the shackle and said first region of the ring is bordered by first rims forming a projection with respect to the spherical outer surface of the ring, around the first coating, so as to form a stop for protecting the first coating and to encapsulate the first coating, or
      the second bore of the sleeve bears a second anti-friction coating on a second region extending beyond its contact region with said pin and said second region is bordered by second rims forming a projection with respect to a surface of the second bore, around the second coating, at the ends of the flared inner surface of the second bore of the sleeve, so as to form a stop for protecting the second coating and to encapsulate the second coating.

2. The shackle for fastening an aircraft engine according to claim 1, in which said first and second rims have a height greater than or equal to 0.1 mm.

3. The shackle for fastening an aircraft engine according to claim 1, in which a surface of the cavity of the body of the shackle having a shape complementary to said spherical outer region of the ring bears a third anti-friction coating.

4. The shackle according to claim 3, wherein the third anti-friction coating is produced by bulk treatment or made of nanocomposite material of type WC:C—H and has a thickness of between 0.2 μm and 50 μm.

5. The shackle according to claim 1, wherein the first anti-friction coating is made of a copper-nickel-indium alloy of type Cu36Ni5In or of a cobalt alloy and has a thickness of between 50 μm and 300 μm.

6. The shackle according to claim 1, wherein the second anti-friction coating is made of a copper-nickel-indium alloy of type Cu36Ni5In, of a copper-aluminum-Fe alloy of type CuAlFe, or of a cobalt alloy and has a thickness of between 50 μm and 300 μm.

7. The shackle according to claim 1, in which the body, the ring and the sleeve are made of the same material chosen from: titanium alloys or steel alloys.

8. A fastening assembly comprising a shackle according to claim 1, and a pin bearing on its external surface a fourth anti-friction coating made of a nanocomposite material of type WC:C—H or WCCo and having a thickness of between 0.2 μm and 50 μm.

9. The fastening assembly according to claim 8, in which the pin is made of a material chosen from: titanium alloys or steel alloys.

10. An aircraft comprising a shackle according to claim 1.

11. An aircraft comprising a fastening assembly according to claim 8.

\* \* \* \* \*